United States Patent
Kan et al.

(10) Patent No.: US 6,250,727 B1
(45) Date of Patent: Jun. 26, 2001

(54) COMPUTER ENCLOSURE

(75) Inventors: Kaven Kan, Tao-Yuan; Tien Sung Lu, Tu-Chen, both of (TW); Zhu Xing Zhou; Yong Xian Wang, both of Shen-Zhen (CN)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 09/433,634

(22) Filed: Nov. 3, 1999

(30) Foreign Application Priority Data

Jan. 29, 1999 (TW) ................................. 88201518

(51) Int. Cl.⁷ .................................................. A47B 97/00
(52) U.S. Cl. ...................... 312/223.2; 312/329; 361/725; 16/262
(58) Field of Search ............................. 312/321.5, 223.1, 312/223.2, 326, 329, 293.1, 293.2, 293.3; 361/683, 684, 686, 724, 725, 726, 727; 16/262, 234, 340, DIG. 43

(56) References Cited

U.S. PATENT DOCUMENTS

| | | | |
|---|---|---|---|
| 574,636 | * | 1/1897 | Slack ..................................... 16/262 |
| 2,766,901 | * | 10/1956 | Sunko ................................ 16/262 X |
| 5,029,364 | * | 7/1991 | Salazar ....................... 16/DIG. 43 X |
| 5,097,386 | * | 3/1992 | Byell et al. ....................... 361/725 X |
| 5,172,305 | * | 12/1992 | DeWilde ......................... 361/725 X |
| 5,214,621 | * | 5/1993 | Maggelet et al. ................ 312/326 X |
| 5,235,494 | * | 8/1993 | Chang et al. ..................... 16/262 X |
| 5,774,337 | * | 6/1998 | Lee et al. ............................. 361/725 |
| 5,845,977 | * | 12/1998 | Neukam et al. .............. 312/265.5 X |
| 5,967,633 | * | 10/1999 | Jung ............................. 312/293.3 X |
| 5,975,659 | * | 11/1999 | Yang et al. ................... 312/265.5 X |
| 6,000,767 | * | 12/1999 | Liu et al. .......................... 312/223.2 |
| 6,000,769 | * | 12/1999 | Chen ................................ 312/329 X |
| 6,097,591 | * | 8/2000 | Ircha ............................. 312/223.2 X |

* cited by examiner

Primary Examiner—Peter M. Cuomo
Assistant Examiner—James O. Hansen
(74) Attorney, Agent, or Firm—Wei Te Chung

(57) ABSTRACT

A computer enclosure includes a cage with a pair of brackets fixed therein for rotatably supporting a mother board tray to which a mother board is fixed. The cage includes a front panel, a rear panel, a top panel and a bottom panel forming a receiving space for receiving the mother board tray. The brackets support shafts that are rotatably received in bores defined in the mother board tray allowing the mother board to be mounted to and/or removed from the mother board tray at a position outside the cage thereby reducing the size of the cage and thus facilitating miniaturization of the computer enclosure.

13 Claims, 3 Drawing Sheets

COMPUTER ENCLOSURE

BACKGROUND OF THE INVENTION

1. Field of the invention

The present invention relates to a computer enclosure, and particularly to a computer enclosure incorporating a movable mother board tray for facilitating mounting a mother board.

2. The Related Art

A conventional computer enclosure includes a cage and a fixed mother board tray incorporated in the cage proximate a side thereof for supporting a mother board thereon. The fixed mother board tray complicates the operation of mounting a mother board in the cage. Furthermore, the complicated operation of mounting the mother board requires a large amount of space inside the cage for the operation. This increases the size of the computer enclosure.

Thus, it is desired to have a movable mother board tray which facilitates mounting a mother board and promotes miniaturization of a computer enclosure.

SUMMARY OF THE INVENTION

Accordingly, an object of the present invention is to provide a computer enclosure comprising a movable mother board tray for facilitating mounting a mother board.

Another object of the present invention is to provide a computer enclosure comprising a movable mother board tray for facilitating miniaturization of the computer enclosure.

To fulfil the objects mentioned above, a computer enclosure in accordance with the present invention comprises a cage with a pair of brackets fixed therein for rotatably supporting a mother board tray to which a mother board is fixed. The cage defines a receiving space for receiving the mother board tray. The mother board tray is pivotally connected to the brackets for moving with respect to the cage thereby allowing the mother board to be mounted to and/or removed from the mother board tray at a position outside the cage.

Other objects and advantages of the present invention will be understood from the following description of a preferred embodiment thereof with reference to the accompanying drawings.

DETAILED DESCRIPTION OF THE PREFERRED EMBODIMENT

Figure 1:
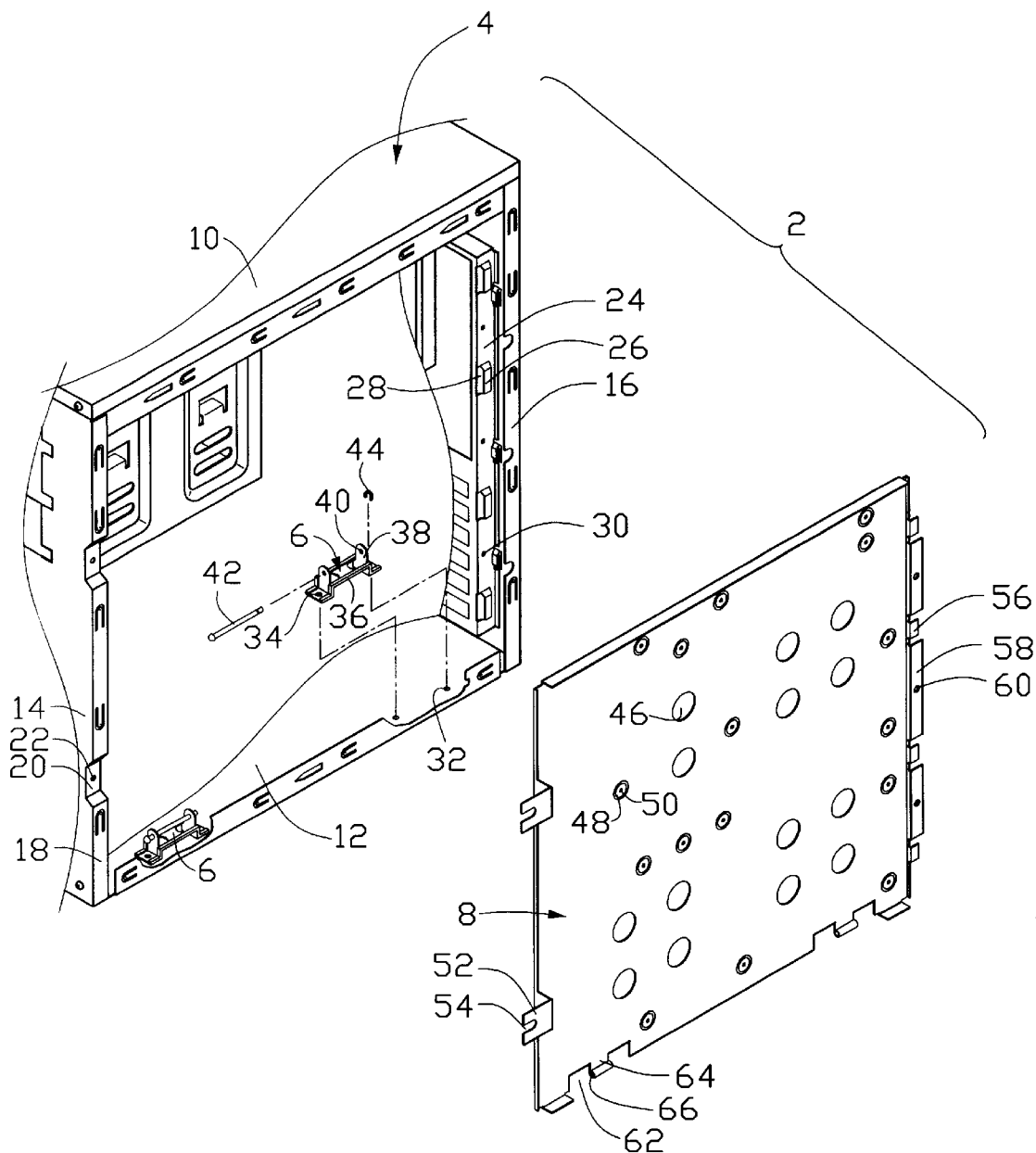
FIG. 1 is an exploded view of a computer enclosure of the present invention.

Referring to FIG. 1, a computer enclosure 2 in accordance with the present invention includes a cage 4, a pair of brackets 6 attached to an inner surface of the cage 4, and a mother board tray 8 pivotally attached to the brackets 6. The cage 4 includes a top panel 10, a bottom panel 12, a front panel 14 and a rear panel 16 forming a receiving space (not labeled) for receiving electronic devices (not shown) therein. The front panel 14 forms a flange 18 which defines a pair of recesses 20 and a pair of screw holes 22 respectively formed in bottom walls of the recesses 20. The rear panel 16 forms a stepped wall 24 forming four protrusions 26 each defining a receiving recess 28. Three screw holes 30 are formed between the protrusions 26. The bottom panel 12 defines two pairs of fixing holes 32.

Each bracket 6 defines a pair of holes 34 in opposite ends thereof and a central protrusion 36. A pair of ledges 38 upwardly extends from opposite sides of the protrusion 36 and each defines an aperture 40. A shaft 42 extends through the apertures 40 of the ledges 38 and is fixed by a clip 44.

The mother board tray 8 defines a plurality of through holes 46 therein and forms a plurality of circular protrusions 48 thereon. Each protrusion 48 defines a central hole 50. A pair of right-angled tabs 52 extends from a front edge of the mother board tray 8. Each tab 52 forms a cutout 54 in a distal end thereof. Four fixing tabs 56 perpendicularly extend from a rear edge of the mother board tray 8 for insertion into the receiving recesses 28 of the stepped wall 24. Three flanges 58 are respectively formed between the fixing tabs 56 for abutting against the stepped wall 24 of the rear panel 16. Each flange 58 defines a hole 60 corresponding to the screw hole 30 of the stepped wall 24. A pair of cutouts 62 is defined a bottom edge of the mother board tray 8 corresponding to the brackets 6. A flake 64 is formed in each cutout 62. Each flake 64 is crimped to form a bore 66 at a distal end thereof for rotatably receiving the corresponding shaft 42.

Figure 2:
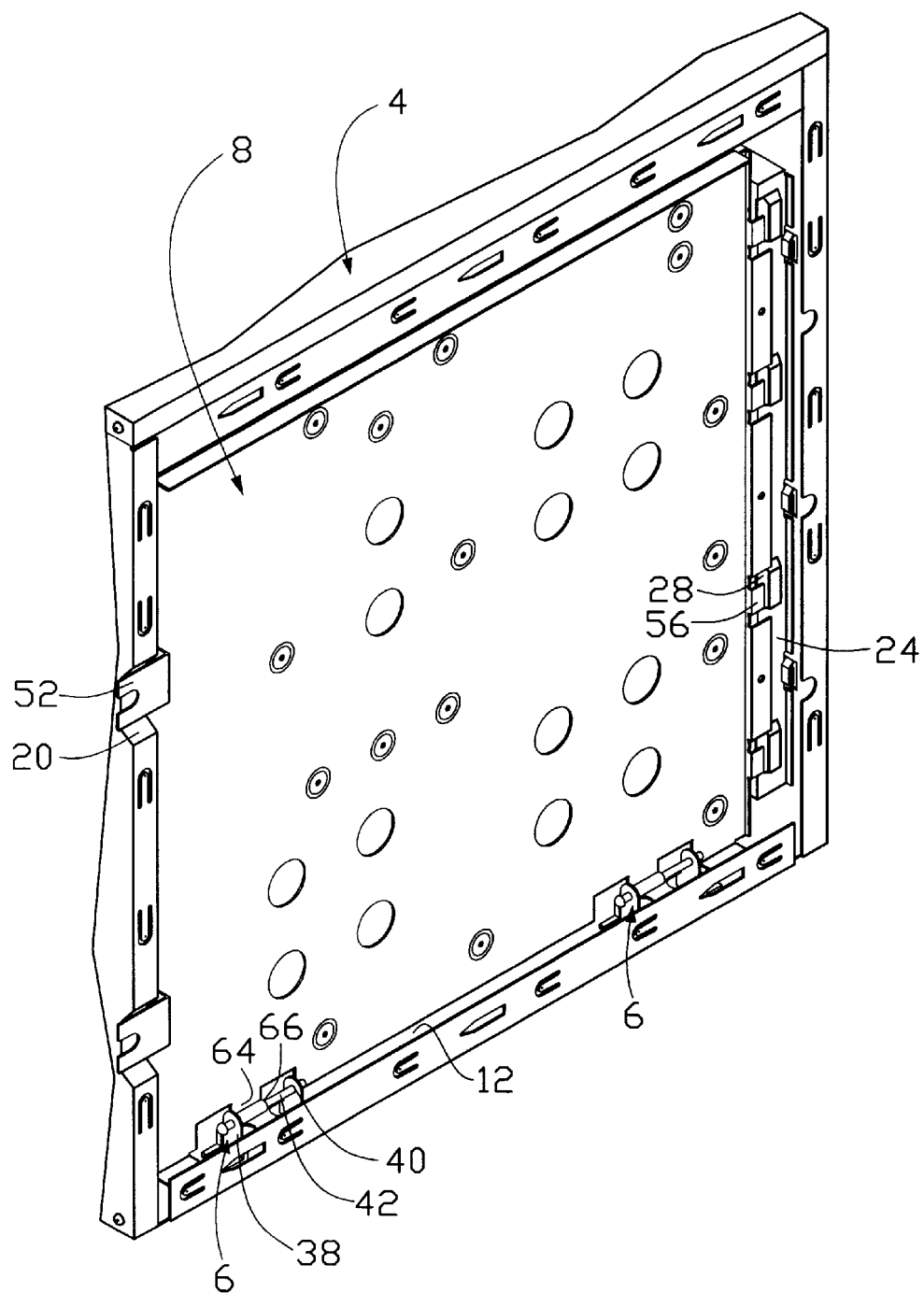
FIG. 2 is a partially assembled view of FIG. 1.
Figure 3:
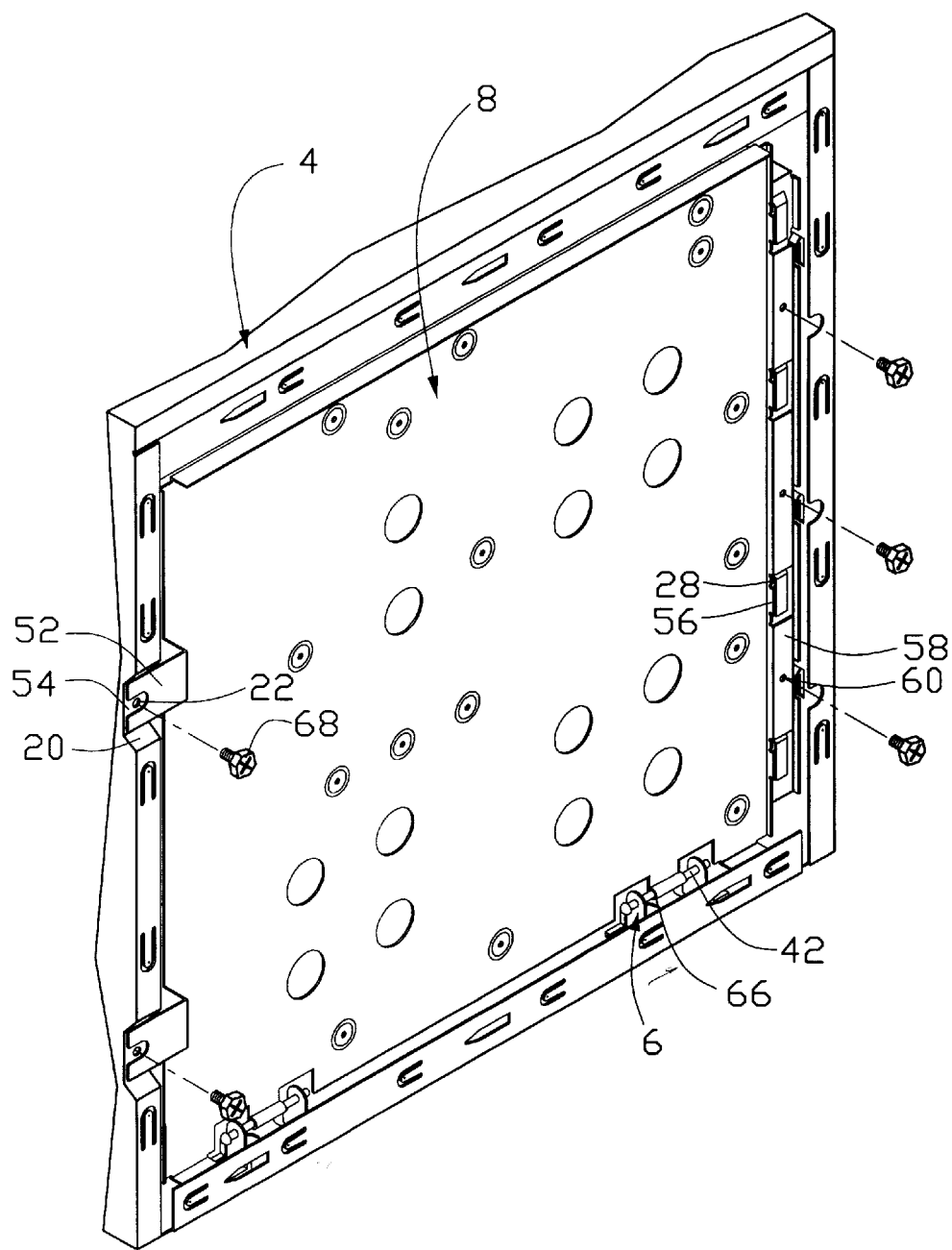
FIG. 3 is an assembled view of FIG. 1.

Referring to FIGS. 2 and 3, in assembly, the brackets 6 are attached to the bottom panel 12 of the cage 4 by means of fasteners (not shown) extending through holes 34, 32 of the brackets 6 and the bottom panel 12. The flakes 64 of the mother board tray 8 are positioned between the ledges 38 of the corresponding brackets 6 and the shafts 42 extend through the apertures 40 of the ledges 38 and the bores 66 of the flakes 64 and are held in place by the clips 44 whereby the mother board tray 8 is pivotable about the shaft 42 for facilitating mounting a mother board (not shown) thereon. Since the mother board can be mounted to the mother board tray 8 at a position outside the cage 4, the cage 4 may have a small size thereby facilitating miniaturization of the computer enclosure. The right-angled tabs 52 are respectively received in the recesses 20 of the cage 4 and the fixing tabs 56 are inserted into the corresponding receiving recesses 28 of the stepped wall 24 with the flanges 58 abutting against the stepped wall 24 and the holes 60 aligning with the screw holes 30 of the stepped wall 24. Each cutout 54 of the rightangled tab 52 aligns with the corresponding screw hole 22 of the front panel 14. Bolts 68 extend through the holes 60 and the cutouts 54 of the mother board tray 8 and threadedly engage with the corresponding screw holes 30, 22 of the cage 4. Thus, the mother board tray 8 is received and retained in the receiving space of the cage.

It will be understood that the present invention may be embodied in other forms without departing from the spirit thereof. The present example and embodiment, therefore, is to be considered in all respects as illustrative and not restrictive, and the invention is not to be limited to the details given herein.

What is claimed is:

1. A computer enclosure comprising:
    a cage comprising a front panel, a rear panel, a top panel and a bottom panel to define a receiving space therebetween, the front pane comprising a flange in which at least one recess is defined, a screw hole being defined in a bottom wall of the recess;
    at least one bracket attached to the bottom panel of the cage; and
    a mother board tray being pivotably connected to the bracket for being movable with respect to the cage to be received and retained in the receiving space of the cage, the mother board tray having at least one tab to engage with the recess of the flange of the front panel, the tab defining a cutout for a bolt to extend therethrough and engage with the screw hole of the front panel, thereby releasably securing the mother board tray to the front panel.

2. The computer enclosure as claimed in claim 1, wherein the bottom panel forms a pair of fixing holes for fixing the bracket.

3. The computer enclosure as claimed in claim 2, wherein the bracket includes a pair of holes formed in opposite ends thereof adapted to receive fasteners that extend through fixing holes of the bottom panel thereby securing the bracket to the bottom panel, a protrusion of the bracket being formed between the holes.

4. The computer enclosure as described in claim 3, wherein a pair of ledges upwardly extends from opposite sides of the protrusion of the bracket.

5. The computer enclosure as described in claim 4, wherein each ledge forms an aperture and a shaft is provided extending through the aperture to rotatably support the mother board tray with respect to the bracket.

6. The computer enclosure as described in claim 5, wherein a cutout is defined in the bottom edge of the mother board tray with a flake formed therein, a bore being defined in the flake for rotatably receiving the shaft.

7. The computer enclosure as described in claim 1, wherein the rear panel includes a stepped wall which defines at least one receiving recess for receiving a fixing tab extending from the mother board tray to fix the mother board tray to the rear panel.

8. The computer enclosure as described in claim 7, wherein at least one screw hole is defined in the stepped wall for engaging with a bolt that secures the mother board tray to the rear panel.

9. The computer enclosure as described in claim 8, wherein a flange extends from the mother board tray and defines a hole for receiving the bolt to secure the mother board tray to the rear panel.

10. A computer enclosure comprising:
   a cage defining a receiving space;
   at least one bracket positioned on the cage and a shaft extending through the at least one bracket, the at least one bracket forming a pair of ledges each defining an aperture, the apertures receiving and supporting the shaft;
   a mother board tray having a pair of flakes, each flake defining a bore for rotatably receiving the shaft, wherein said mother board tray is slidable along said shaft to engage a rear edge of the mother board tray with a rear panel of the cage; and
   bolts for fixing the rear edge of the mother board tray to the rear panel of the cage.

11. The computer enclosure as described in claim 10, wherein at least one fixing tab is formed on the mother board for engaging with at least one receiving recess in the cage.

12. A computer enclosure comprising:
   a cage defining a receiving space;
   at least one bracket attached to the cage; and
   a mother board tray being pivotably connected to the bracket for being movable with respect to the cage to be received and retained in the receiving space of the cage; wherein
   the cage includes a front panel, a rear panel, a top panel and a bottom panel for defining the receiving space therebetween, and wherein the bracket is attached to the bottom panel; wherein
   the bottom panel forms a pair of fixing holes for fixing the bracket; wherein
   the front panel includes a flange in which at least one recess is defined; wherein
   a screw hole is defined in a bottom wall of the recess of the front panel for engaging with a bolt that releasably secures the mother board tray to the front panel.

13. A computer enclosure comprising:
   a cage defining a receiving space;
   at least one bracket attached to the cage; and
   a mother board tray being pivotably connected to the bracket for being movable with respect to the cage to be received and retained in the receiving space of the cage; wherein
   the cage includes a front panel, a rear panel, a top panel and a bottom panel for defining the receiving space therebetween, and wherein the bracket is attached to the bottom panel; wherein
   the bottom panel forms a pair of fixing holes for fixing the bracket; wherein
   the bracket includes a pair of holes formed in opposite ends thereof adapted to receive fasteners that extend through fixing holes of the bottom panel thereby securing the bracket to the bottom panel, a protrusion of the bracket being formed between the holes; wherein
   a pair of ledges upwardly extends from opposite sides of the protrusion of the bracket; wherein
   each ledge forms an aperture for receiving and supporting a shaft which rotatably supports the mother board tray; wherein
   a cutout is define in the bottom edge of the mother board tray with a flake formed therein, a bore being defined in the flake for rotatably receiving the shaft.

* * * * *